United States Patent
Jo et al.

(10) Patent No.: US 10,641,374 B2
(45) Date of Patent: May 5, 2020

(54) SEPARATE CHAMBER TYPE TORQUE CONVERTER

(71) Applicants: HYUNDAI MOTOR COMPANY, Seoul (KR); KIA MOTORS CORPORATION, Seoul (KR)

(72) Inventors: Se-Hwan Jo, Bucheon-si (KR); Hyun-Jun Son, Seongnam-si (KR); Jong-Gu Lee, Seoul (KR); Pan-Seok We, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/185,287

(22) Filed: Nov. 9, 2018

(65) Prior Publication Data

US 2019/0323588 A1    Oct. 24, 2019

(30) Foreign Application Priority Data

Apr. 23, 2018  (KR) .................. 10-2018-0046838

(51) Int. Cl.
  *F16H 45/02*    (2006.01)
(52) U.S. Cl.
  CPC ....... *F16H 45/02* (2013.01); *F16H 2045/021* (2013.01); *F16H 2045/0215* (2013.01); *F16H 2045/0221* (2013.01); *F16H 2045/0284* (2013.01)

(58) Field of Classification Search
  CPC .............. F16H 45/02; F16H 2045/021; F16H 2045/0284; F16H 2045/0215; F16H 2045/0221
  See application file for complete search history.

(56) References Cited

U.S. PATENT DOCUMENTS

| | | | |
|---|---|---|---|
| 10,054,208 B2* | 8/2018 | Depraete | F16F 15/12353 |
| 2005/0133328 A1* | 6/2005 | Masuya | B60K 6/387 |
| | | | 192/3.3 |
| 2006/0124420 A1* | 6/2006 | Ackermann | F16H 45/02 |
| | | | 192/3.29 |
| 2011/0132709 A1* | 6/2011 | Fukunaga | F16H 41/24 |
| | | | 192/3.23 |
| 2013/0186724 A1* | 7/2013 | Miyahara | F16F 15/145 |
| | | | 192/3.23 |
| 2016/0017971 A1* | 1/2016 | Sayre | F16H 45/02 |
| | | | 192/3.29 |
| 2016/0116020 A1 | 4/2016 | Tomiyama | |
| 2017/0002908 A1* | 1/2017 | Saka | F16H 45/02 |
| 2017/0268578 A1* | 9/2017 | Matsuda | F16D 13/52 |

(Continued)

FOREIGN PATENT DOCUMENTS

| | | | |
|---|---|---|---|
| JP | 2008-089052 A | 4/2008 | |
| JP | 2013-145025 A | 7/2013 | |

(Continued)

*Primary Examiner* — David J Hlavka
(74) *Attorney, Agent, or Firm* — Brinks Gilson & Lione

(57) ABSTRACT

A torque converter may include: an impeller and a turbine hub to form a chamber together, a damper piston connected to a damper clutch and divide the chamber into a damper chamber and a balance chamber, a discharge path to connect and block the balance chamber and control an internal flow rate of the torque converter, and an O-ring to open or close the discharge path.

12 Claims, 5 Drawing Sheets

(56) References Cited

U.S. PATENT DOCUMENTS

2018/0106350 A1* 4/2018 Hilty .................. F16H 41/24
2018/0313407 A1* 11/2018 Smith ................. F16D 13/76

FOREIGN PATENT DOCUMENTS

| JP | 2016-044778 A | 4/2016 |
| JP | 2016-217447 A | 12/2016 |
| KR | 10-2014-0144678 A | 12/2014 |

* cited by examiner

SEPARATE CHAMBER TYPE TORQUE CONVERTER

CROSS-REFERENCE TO RELATED APPLICATION

This application claims priority to and the benefit of Korean Patent Application No. 10-2018-0046838, filed on Apr. 23, 2018, the entire contents of which are incorporated herein by reference.

FIELD

Exemplary forms of the present disclosure relate to a torque converter to improve its performance.

BACKGROUND

The statements in this section merely provide background information related to the present disclosure and may not constitute prior art.

Generally, a torque converter of an automatic transmission includes an impeller, a turbine, and a stator as basic components and further includes a lockup clutch capable of directly and mechanically transmitting a torque in a high-speed section.

For example, the lockup clutch is disposed in a space formed between a front cover which is an input-side rotating member of the torque converter, and a turbine which is an output-side rotating member thereof and includes an internal pressure chamber together with a damper hydraulic chamber.

The damper hydraulic chamber is operated as a hydraulic chamber for a lockup clutch engagement so as to implement a direct torque transmission from the front cover to the turbine. The internal pressure chamber controls the line pressure to be decreased so as to deliver a control pressure adjusted by a solenoid valve of a hydraulic line with an appropriate line pressure.

Therefore, the lockup clutch improves the line pressure increased by an internal pressure of the torque converter together with the torque transmission during an ON or OFF operation of a damper. Consequently, when the damper is operated, the torque converter may use an internal pressure applied to a piston, which is about 3 bars lower than that of the lockup clutch not applied to an internal pressure chamber.

However, we have discovered that there is a difficulty in that a line pressure down control should be performed without degradation in operating performance of the torque converter.

For example, since the internal pressure chamber of the lockup clutch is focused to decrease the line pressure, we have discovered that the following problems are caused. First, a loss of an internal flow rate of the torque converter may be caused while the line pressure is decreased, and thus there occurs a problem in that a lubrication flow rate is decreased relative to a transmission to the loss of the internal flow rate. Second, air may flow into the internal pressure chamber of the lockup clutch when the internal pressure chamber is left for a long period of time, and thus there occurs a problem of malfunction of a damper piston due to a centrifugal pressure.

Therefore, the line pressure down control of the torque converter should be capable of decreasing a line pressure, while reducing a loss of an internal flow rate, and inhibiting an inflow of air.

SUMMARY

The present disclosure is directed to a separate chamber type torque converter in which a balance chamber constituting a separate chamber with respect to a damper chamber is configured with an input shaft path, and thus a line pressure desired for a transmission can be decreased to improve fuel efficiency, and specifically, as a line pressure is decreased, a loss of an internal flow rate causing a shortage in lubrication flow rate of the transmission and an inflow of air causing malfunction of a damper piston can be inhibited or prevented, thereby improving performance of the separate chamber type torque converter.

Other objects and advantages of the present disclosure can be understood by the following description and become apparent with reference to the forms of the present disclosure. Also, it is obvious to those skilled in the art to which the present disclosure pertains that the objects and advantages of the present disclosure can be realized by the means as disclosed and combinations thereof.

In one form of the present disclosure, a torque converter includes: an impeller and a turbine hub configured to form a chamber together, a damper piston connected to a damper clutch and configured to divide the chamber into a damper chamber and a balance chamber, a discharge path configured to connect and block the balance chamber and control an internal flow rate of the torque converter, and an O-ring configured to open or close the discharge path.

The damper chamber and the balance chamber may be configured with a lockup clutch for implementing ON or OFF operation of a damper.

The damper chamber and the balance chamber may be opposite to each other to face the damper piston. The damper chamber may be connected to a damper supply path for supplying a damper oil pressure. The balance chamber may be connected to a balance drain path through which a lubrication flow of an input shaft is supplied to a lubrication path of the input shaft.

The discharge path may be blocked when a damper is in an ON state for a direct connection of the damper clutch and may be open when the damper is in an OFF state to release the damper clutch.

The discharge path may include an inlet toward the damper chamber and an outlet toward the balance chamber, and the O-ring is disposed at the discharge path. The discharge path may be formed of a groove or an orifice.

The O-ring may be moved together with the damper piston.

A balance spring may be provided in the balance chamber to apply spring elasticity to the damper piston.

A balance plate may be provided at the balance chamber to form the discharge path and to be moved together with the damper piston while being coupled to the damper piston.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
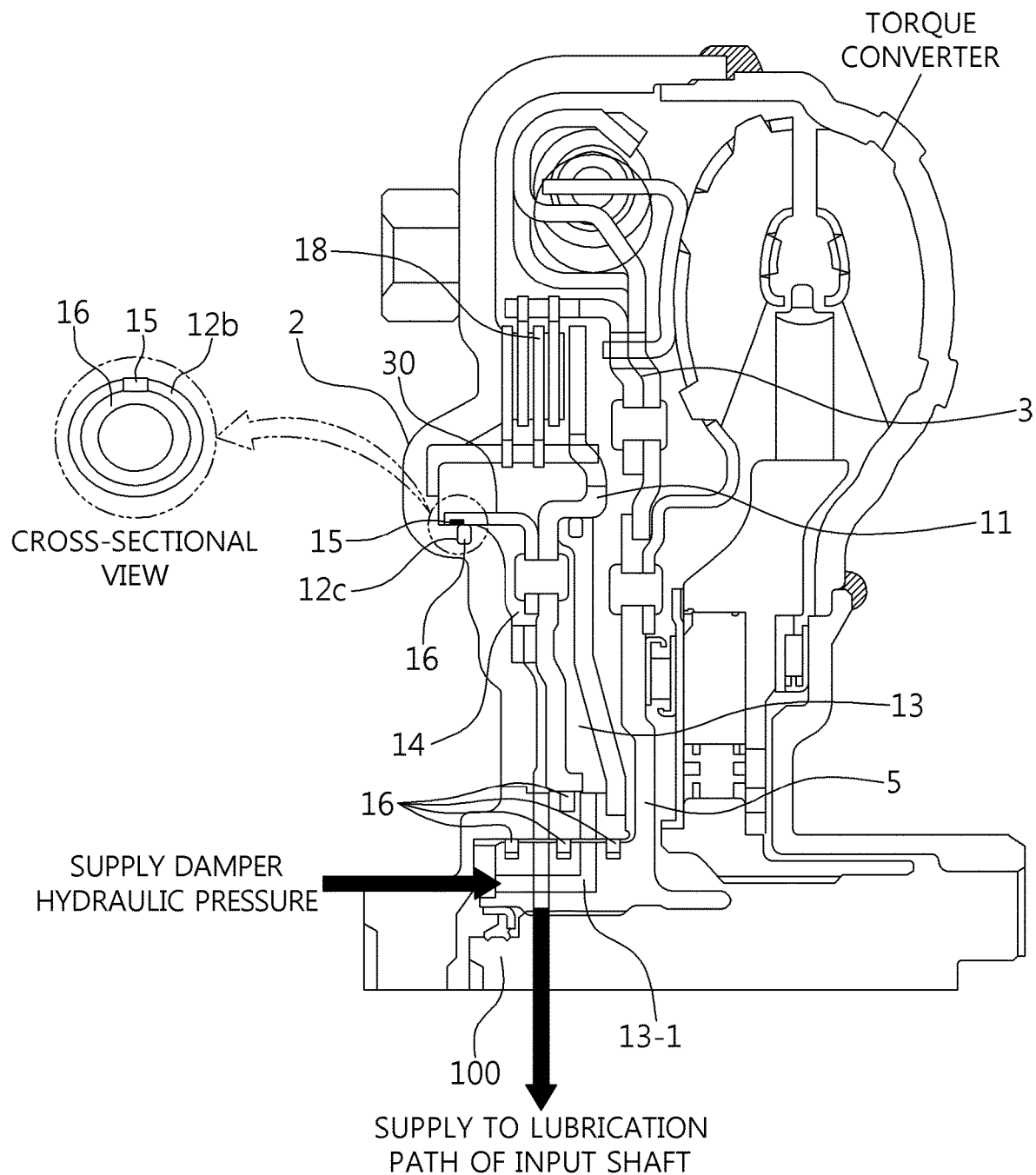
FIG. 1 is a configurational diagram of a separate chamber type torque converter.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure may be embodied in different forms by those skilled in the art to which the present disclosure pertains, so that the present disclosure is not limited to these forms.

Referring to FIG. 1, a torque converter 1 in one form of the present disclosure includes an impeller 2, a turbine 3, a stator 4, and a lockup clutch 10.

For example, the impeller 2, the turbine 3, and the stator 4 are basic components of the torque converter 1. The impeller 2 is configured together with a front cover and connected to a crank shaft (not shown) of an engine to be rotated together with the engine. The turbine 3 is disposed to face the impeller 2 and is rotated by fluid supplied from the impeller 2 to drive an input shaft 100 of a transmission through a turbine hub 5. The stator 4 has a center of rotation identical to that of the front cover of the impeller 2 changes a flow of fluid (oil for an automatic transmission) from the turbine 3 to transmit the fluid toward the impeller 2.

For example, the lockup clutch 10 acts as a means for connecting the engine and the transmission with an arrangement in connection with the turbine hub 5 between the impeller 2 (i.e., the front cover) and the turbine 3.

To this end, the lockup clutch 10 further includes a pair of chambers having a damper piston 11 and a damper clutch 18 and which are separated from each other and communicate with each other.

Specifically, when a damper is in an ON state, the damper piston 11 applies a pressure to the damper clutch 18 to bring the lockup clutch 10 to an engagement state. The damper clutch 18 includes a plurality of clutch discs and a retaining plate which receive a pressure applied by the damper piston 11 while being supported on the impeller 2 (i.e., the front cover). The pair of chambers serve to improve performance by reducing or preventing a loss of an internal flow rate and an inflow of air in conjunction with a lubricating oil path 100-1 of the input shaft 100 while improving fuel efficiency by decreasing a line pressure desired for the transmission.

Specifically, each of the pair of chambers includes a damper chamber 13, a balance chamber 14, a discharge path 15, and an O-ring 16 as components.

For example, the damper chamber 13 is formed in a space in which the damper piston 11 faces the turbine hub 5 connected to the input shaft 100, and a damper oil pressure is supplied to the damper chamber 13 when the damper is in the ON state (i.e., the damper is directly connected). The balance chamber 14 is formed in a space in which the impeller 2 faces the damper piston 11, and lubricating oil is supplied to the balance chamber 14 when the damper is in the ON state. The discharge path 15 is formed on a contact surface between the impeller 2 and the damper piston 11 and extends from the balance chamber 14 to a lubricating oil path 100-1 so as to discharge an internal flow rate of the torque converter 1 to the lubricating oil path 100-1 of the input shaft 100 when the damper is in an OFF state (that is, the damper is released). In this case, the discharge path 15 is formed of a recessed groove. The O-ring 16 is provided at the damper piston 11 and blocks the discharge path 15 by an advance of the damper piston 11 due to the ON state of the damper whereas opens the discharge path 15 by return of the damper piston 11 by the OFF state of the damper.

Particularly, the damper chamber 13 is connected to a damper supply path 13-1 formed at the input shaft 100 and the turbine hub 5, and a damper hydraulic pressure is supplied to the damper supply path 13-1.

Further, the balance chamber 14 is connected to the lubricating oil path 100-1 of the input shaft 100 through a balance drain path 14-1, and when the damper is in an OFF state in a state in which the balance chamber 14 is not exposed to the atmosphere so as to prevent an inflow of air, a lubrication pressure for moving the damper piston 11 to a release position is always formed without a separate release mechanism. Therefore, the balance chamber 14 uses a flow rate, which is discharged by the discharge path 15 when the damper is in an OFF state, for a lubrication supply to fundamentally improve a loss of a lubrication flow rate.

Further, when the damper is in an ON state, the discharge path 15 is moved to block the O-ring 16 due to a movement of a sealing position of the damper piston 11, but when the damper is in an OFF state, the discharge path 15 is opened to supply a damper flow rate (that is, a token flow rate) of the damper chamber 13 to the balance chamber 14. The discharge path 15 adjusts a discharge flow rate through an area tuning.

In particular, a balance plate 30 is included in the lockup clutch 10. The balance plate 30 is rivet-coupled to the damper piston 11 and is accommodated in the balance chamber 14, and the discharge path 15 is formed of a groove and is in contact with the O-ring 16 inserted into a cover recess 12c which is recessed at the front cover of the impeller 2.

Therefore, the balance plate 30 is moved to a direct engagement position and a release position of the damper piston 11 together therewith, so that a position of an outlet of the discharge path 15 is moved relative to the O-ring 16, and when the outlet of the discharge path 15 is opened, a damper flow rate, which is blocked when the outlet of the discharge path 15 is blocked, is discharged from the damper chamber 13 to the balance chamber 14.

Figure 2:
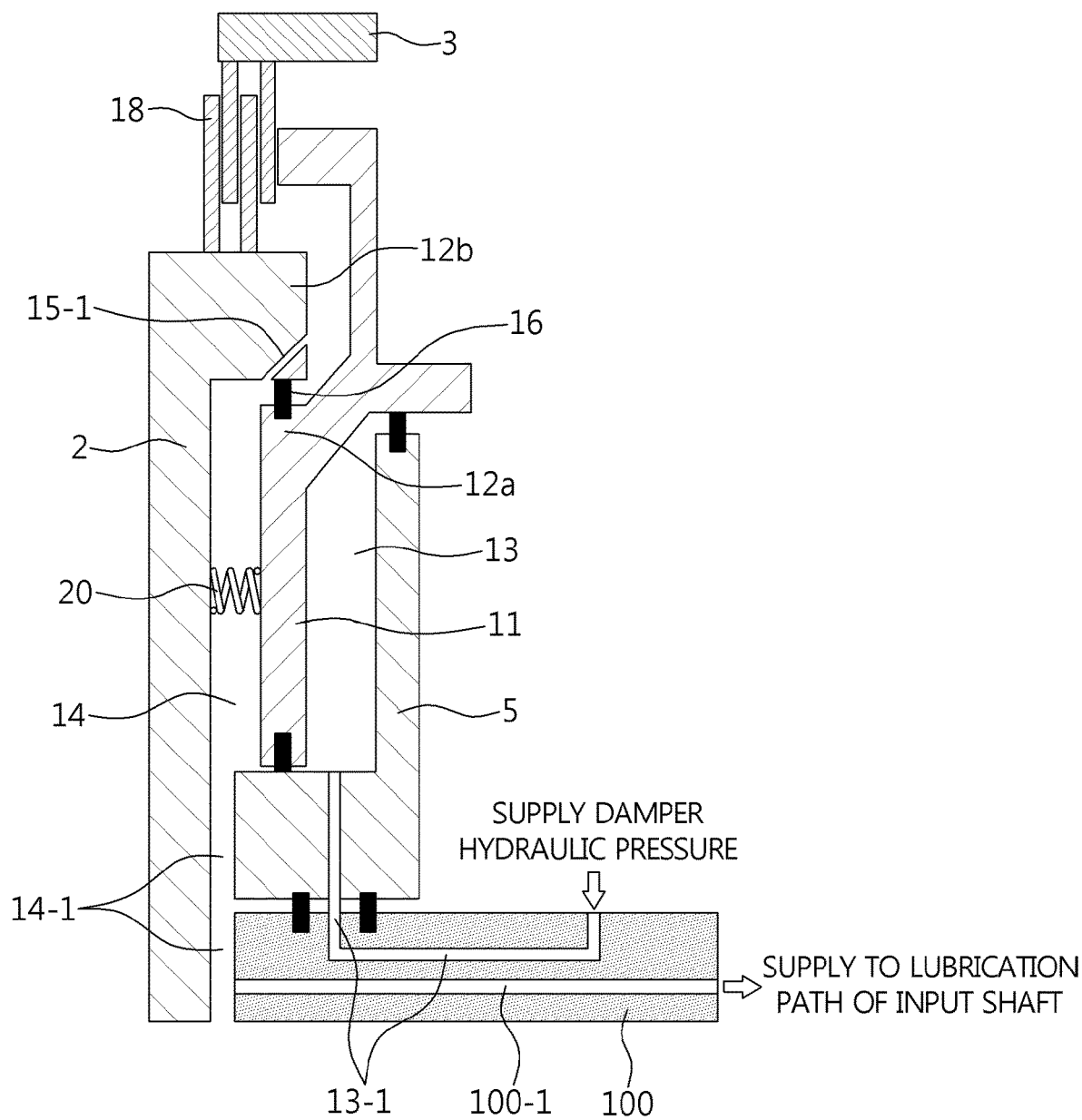
FIG. 2 is a simplified example of a lockup clutch of the separate chamber type torque converter.
Figure 3:
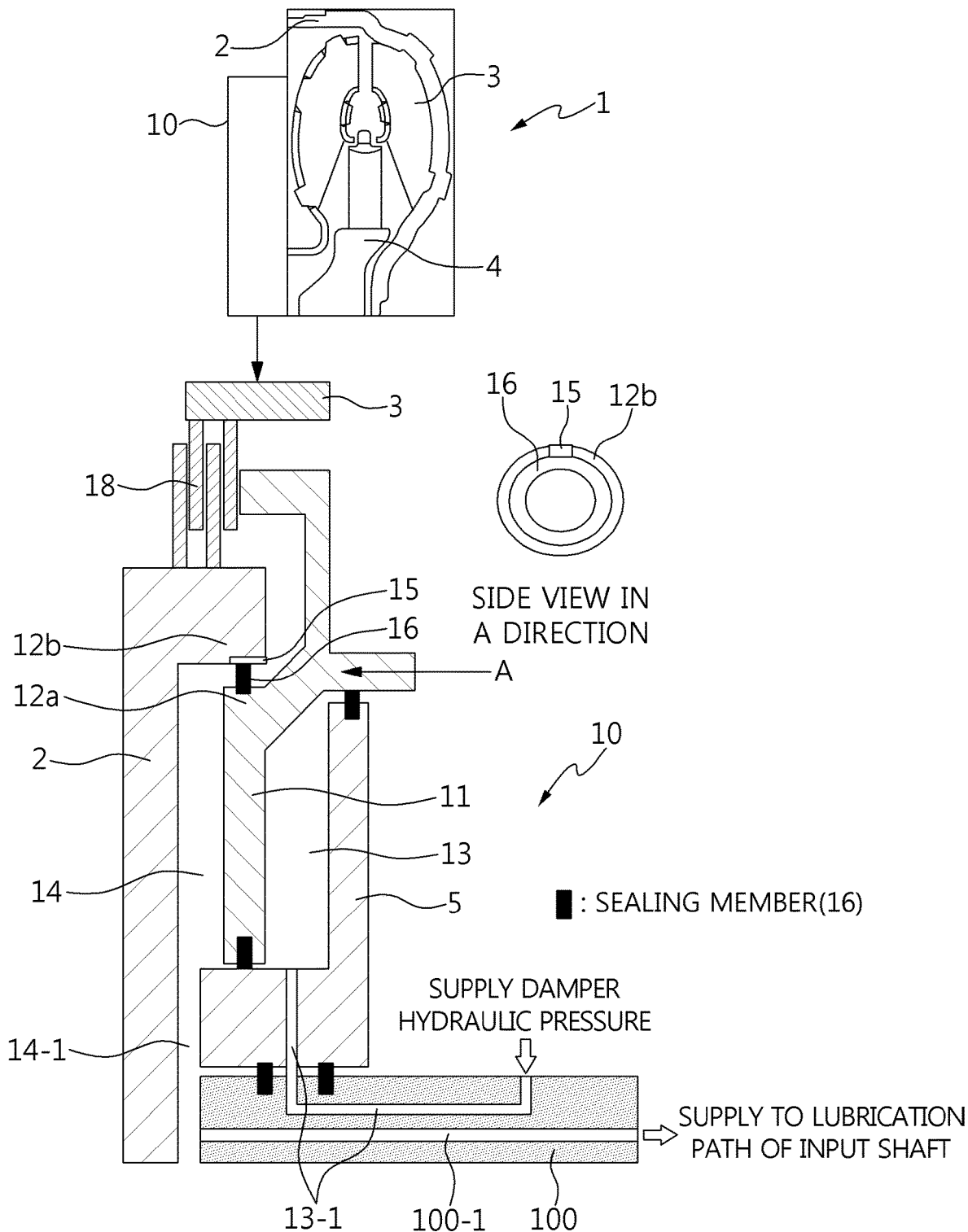
FIG. 3 is an another simplified example of a lockup clutch of the separate chamber type torque converter.

Meanwhile, FIGS. 2 and 3 illustrate a structural modification of the lockup clutch 10 in one form of the present disclosure. In this case, the lockup clutch 10 has the damper chamber 13, the balance chamber 14, and the O-ring 16 as common components of a chamber.

Referring to FIG. 2, the lockup clutch 10 includes an orifice 15-1 and a balance spring 20.

Particularly, the orifice 15-1 is formed with an upward inclined structure of connecting the damper chamber 13 and the balance chamber 14 and being directly recessed at a cover boss 12b formed at the front cover of the impeller 2, and an outlet through which a damper flow rate of the damper chamber 13 is discharged is opened or closed by the O-ring 16. In this case, the upward inclined structure of the discharge orifice 15-1 is formed at an acute angle toward the damper clutch 18. Therefore, the orifice 15-1 opens or closes the outlet by the O-ring 16 to perform the same function as that of the discharge path 15 configured with the groove of FIG. 1.

Particularly, the balance spring 20 has both ends fixed to the impeller 2 (i.e., the front cover) and the damper piston 11 and is accommodated in the balance chamber 14, and when the damper piston 11 is directly connected, the balance spring 20 applies spring elasticity to the damper piston 11 when being compressed and then released. Therefore, as shown in FIGS. 1 to 3, the balance spring 20 adds the spring elasticity to the damper piston 11 which is operated by the lubrication flow rate, thereby improving an enter impact due to the ON state of the damper and release responsiveness due to the OFF state of the damper.

Referring to FIG. 3, a chamber of the lockup clutch 10 is formed using a linkage structure of the impeller 2 and the damper piston 11.

For example, a piston boss 12a is formed at the damper piston 11, and the cover boss 12b having a cover recess 12c recessed thereat is formed at the front cover of the impeller 2. Therefore, the piston boss 12a and the cover boss 12b form a position space of the discharge path 15 as well as a contact surface of the O-ring 16.

Consequently, the lockup clutch 10 is configured with the damper chamber 13, the balance chamber 14, the discharge path 15, and the O-ring 16 as components to use a single chamber, thereby decreasing a line pressure desired for a transmission to improve fuel efficiency as well as coupling to the lubricating oil path 100-1 of the input shaft 100 and preventing a loss of the internal flow rate and an inflow of external air to improve performance of the lockup clutch 10.

Figure 4:
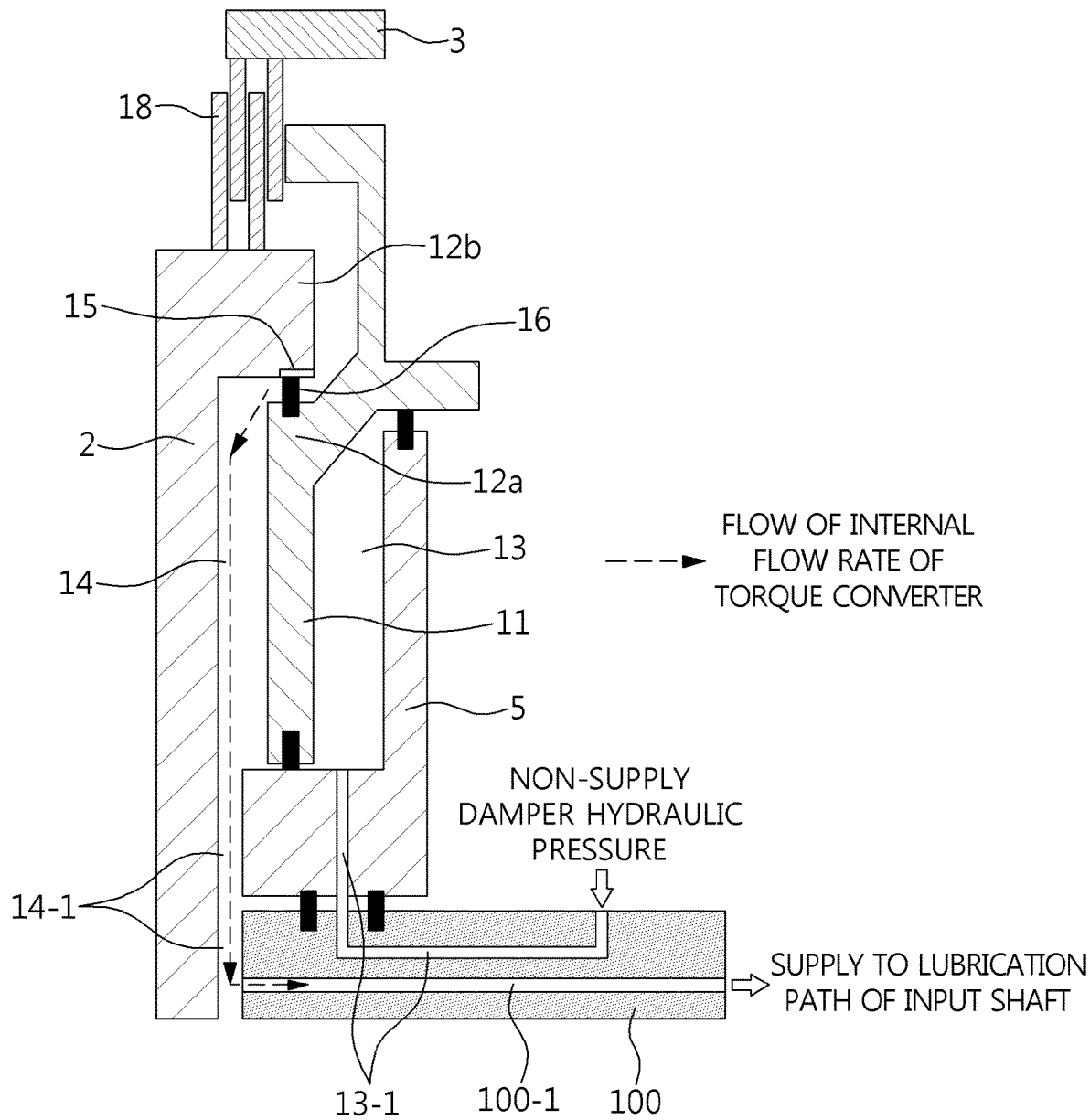
FIG. 4 is a state in which a balance chamber is opened when a damper of the lockup clutch is in an OFF state.
Figure 5:
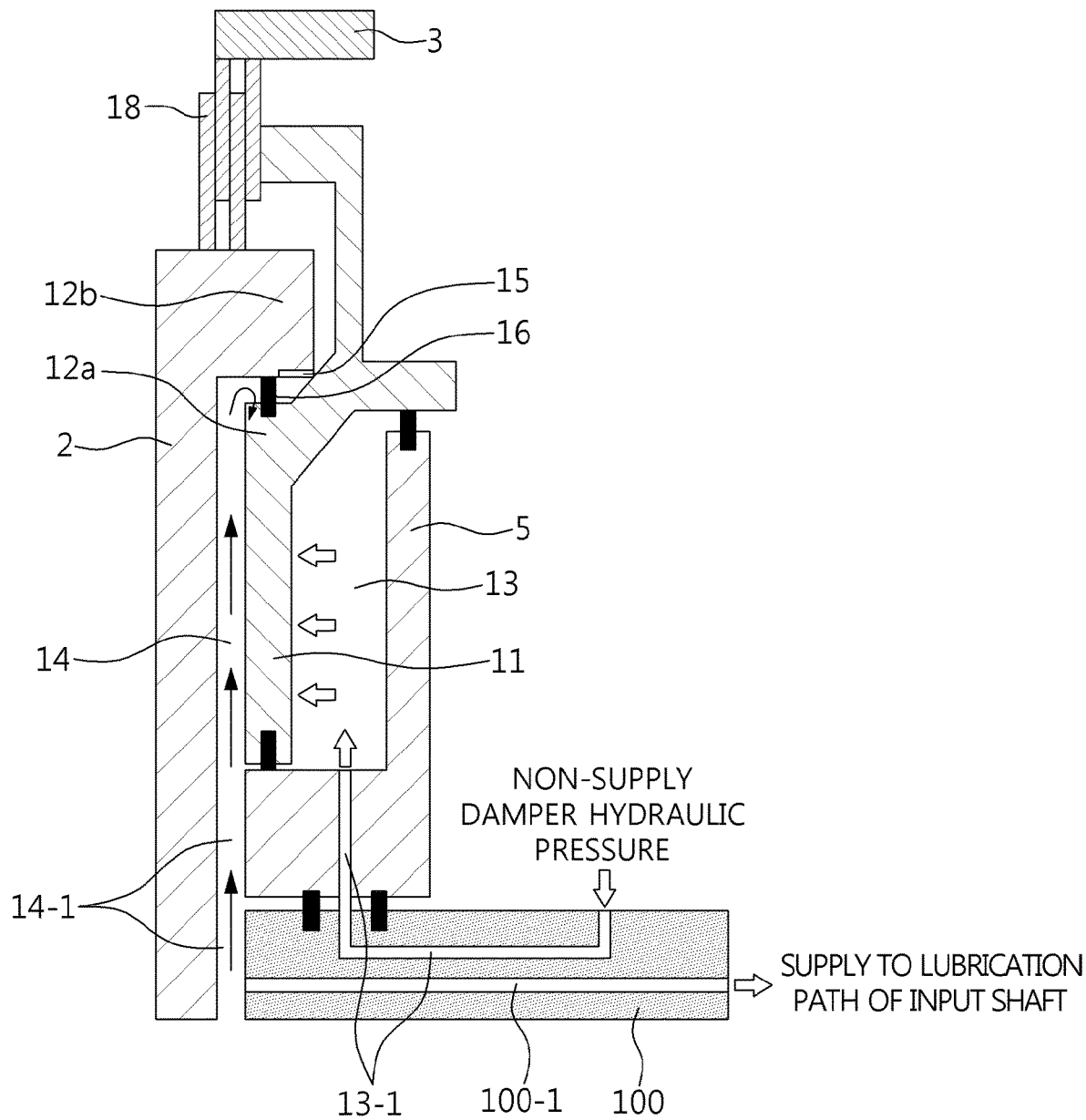
FIG. 5 is a state in which a balance is closed when the damper of the lockup clutch is in an ON state.

As an exemplary form of the present disclosure, FIGS. 4 and 5 illustrate a chamber state when the lockup clutch 10 is operated according to OFF and ON states of the damper, and a description will be made on the basis of FIG. 3.

Referring to an operation of the lockup clutch 10 according to the OFF state of the damper in FIG. 4, a damper flow rate from the damper supply path 13-1 is not supplied to the damper chamber 13, and thus the damper piston 11 is moved to a release position. At this point, the lubrication flow rate of the balance chamber 14 acts to move the damper piston 11 to the release position.

Subsequently, the O-ring 16 is moved to the release position together with the damper piston 11 to form an outlet connection position for the discharge path 15, and the outlet connection position opens the outlet of the discharge path 15, which was blocked by the O-ring 16. Thus, an internal flow rate of the torque converter 1 forms a flow of a flow rate (see a downward dashed arrow) flowing into the balance chamber 14 via the discharge path 15. Then, the internal flow rate of the torque converter 1 flowing into the balance chamber 14 is supplied to the lubricating oil path 100-1 of the input shaft 100 via the balance drain path 14-1 connected to the balance chamber 14.

Consequently, the torque converter 1 utilizes lubrication of the input shaft 100 and the flow rate from balance chamber 14, thereby inhibiting or preventing a loss of the internal flow rate of torque converter 1 while decreasing the line pressure desired for the transmission.

Meanwhile, referring to an operation of the lockup clutch 10 according to the ON state of the damper in FIG. 5, the damper chamber 13 is filled with an oil pressure supplied from the damper supply path 13-1 to form a damper hydraulic pressure, and thus a direct connection of the damper clutch 18 is made together with a direct connection position movement of the damper piston 11. At the same time, the balance chamber 14 is filled with the lubrication flow rate supplied from the lubricating oil path 100-1 of the input shaft 100 to form a lubrication hydraulic pressure in the range of about 0.2 to 0.5 bar.

Subsequently, the O-ring 16 is moved to a direct connection position together with the damper piston 11 to form an outlet block position for the discharge path 15, and the outlet block position blocks the outlet of the discharge path 15, which was not blocked by the O-ring 16. Thus, the damper chamber 13 and the balance chamber 14 are formed as independent chambers separated by the O-ring 16.

Consequently, the torque converter 1 inhibits or prevents an inflow of air by blocking exposure of the balance chamber 14 to the air while allowing the lubrication pressure of the input shaft 100 to be stably supplied to the balance chamber 14. Particularly, the torque converter 1 uses the lubrication flow rate of the balance chamber 14 to move the damper piston 11 to the release position.

As described above, the torque converter 1 in exemplary forms of the present form includes the lockup clutch 10, and the lockup clutch 10 includes the chamber divided into the damper chamber 13 and the balance chamber 14 which face the damper piston 11 for directly connecting to the damper clutch 18 with the damper hydraulic pressure when the damper is in the ON state, and the discharge path 15 of which the outlet blocked by the O-ring 16 is opened to transmit the internal flow rate of the torque converter 1 to the input shaft 100 via the balance chamber 14 when the damper is in the OFF state, such that the line pressure desired for a transmission is decreased as well as the loss of the internal flow rate and the inflow of air, which are desired for performance improvement, are inhibited.

The above-described torque converter 1 of the present disclosure implements the following actions and effects by applying a balance chamber connected to the input shaft path.

First, there is an effect of improving fuel efficiency resulting from decreasing a line pressure toward a balance chamber to lower an internal pressure of a torque converter, which is applied to a damper piston, and decrease a line pressure desired for a transmission. Second, there is an effect of fundamentally resolving a problem due to a conventional internal pressure chamber structure, which is resulting from improvement in loss of a lubrication flow rate and in inflow of air by supplying a lubrication pressure when being left and a damper is in an ON state. Third, it is possible to simplify the structure by improving air generation of the balance chamber using a flow rate discharge groove applied to a sealing seating part of the damper piston and by improving the loss of the lubrication flow rate using a lubrication supplier of the input shaft applied to the balance chamber.

What is claimed is:

1. A torque converter comprising:
an impeller and a turbine hub configured to form a chamber together;
a damper piston connected to a damper clutch and configured to divide the chamber into a damper chamber and a balance chamber;
a discharge path formed on a contact surface between the impeller and the damper piston and configured to control an internal flow rate of the torque converter; and
an O-ring configured to control the discharge path by a movement of a sealing position of the damper piston.

2. The torque converter of claim 1, wherein the damper chamber and the balance chamber are configured with a lockup clutch for implementing ON or OFF operation of a damper.

3. The torque converter of claim 2, wherein the damper chamber is connected to a damper supply path configured to supply a damper oil pressure.

4. The torque converter of claim 2, wherein the balance chamber is connected to a balance drain path through which a lubrication flow of an input shaft is supplied.

5. The torque converter of claim 4, wherein the balance drain path is connected to a lubrication path of the input shaft.

6. The torque converter of claim 1, wherein the discharge path is blocked when a damper is in an ON state for a direct connection of the damper clutch and is open when the damper is in an OFF state so as to release the damper clutch.

7. The torque converter of claim 6, wherein the discharge path is formed of a groove.

8. The torque converter of claim 6, wherein the discharge path is formed of an orifice.

9. The torque converter of claim 1, wherein the O-ring is moved together with the damper piston.

10. The torque converter of claim 1, wherein a balance spring is provided in the balance chamber and configured to apply spring elasticity to the damper piston.

11. The torque converter of claim 1, wherein a balance plate is provided at the balance chamber and forms the discharge path, and the balance plate is configured to be moved together with the damper piston.

12. The torque converter of claim 11, wherein the balance plate is coupled to the damper piston.

* * * * *